Oct. 7, 1941.　　　　　F. M. HEATH　　　　　2,258,386
FLUSH TANK VALVE ROD BEARING ARM ADJUSTING AND TESTING DEVICE
Filed May 13, 1940
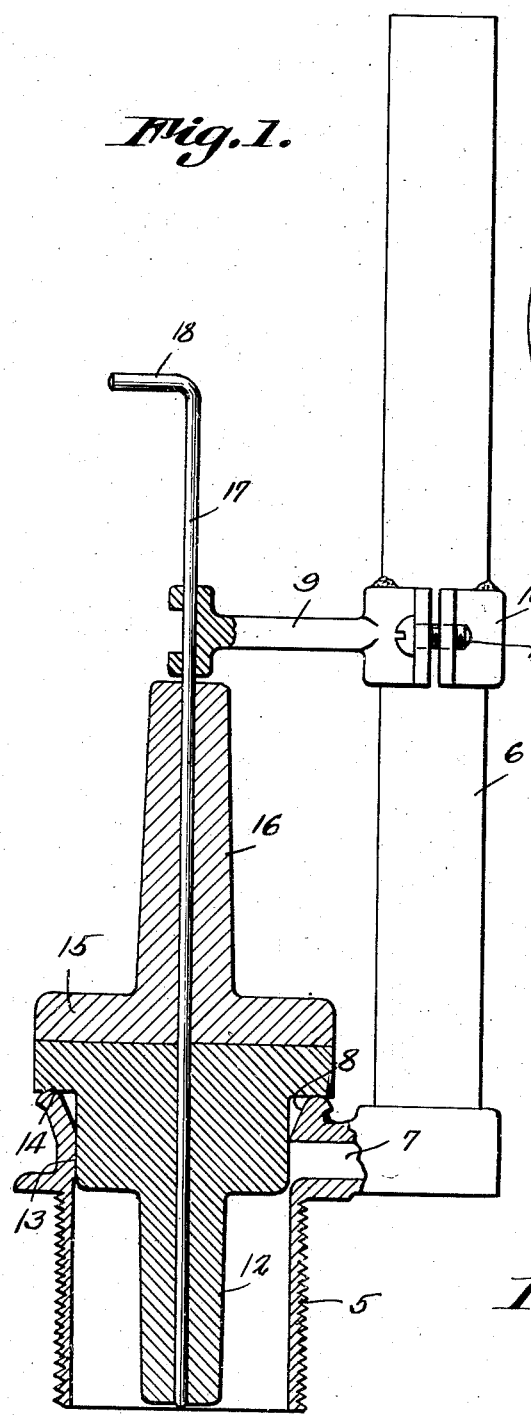
*Fig. 1.*
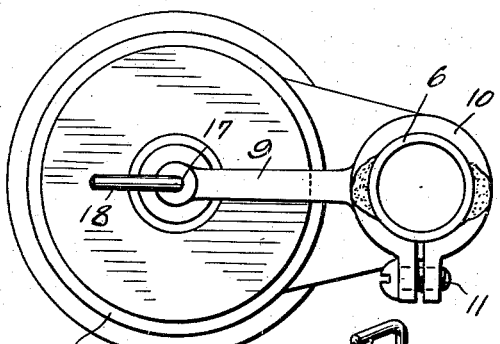
*Fig. 2.*
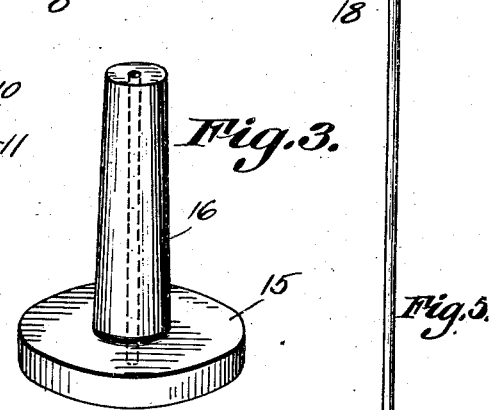
*Fig. 3.*
*Fig. 5.*
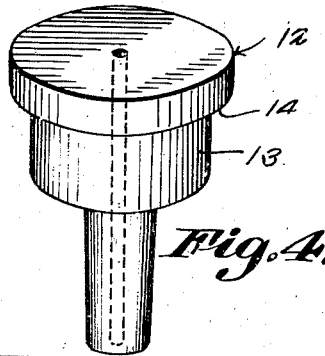
*Fig. 4.*
Frank M. Heath
INVENTOR.
BY *C. A. Snow & Co.*
ATTORNEYS.

Patented Oct. 7, 1941

2,258,386

UNITED STATES PATENT OFFICE 2,258,386

FLUSH TANK VALVE ROD BEARING ARM ADJUSTING AND TESTING DEVICE

Frank M. Heath, Silver Spring, Md.

Application May 13, 1940, Serial No. 334,865

2 Claims. (Cl. 33—180)

In the well known type of flush tank valve construction, it is common practice to provide a valve rod guide arm which is adjustably mounted on the vertical overflow pipe of the valve assembly. Because the valve rod guide arm is adjustably supported, adjustments of the valve rod guide arm are frequently made by unauthorized and unskilled persons, to the end that the valve rod guide arm is frequently thrown out of alignment to impair the true operation of the valve and valve rod guided by the arm.

It is therefore the primary object of the present invention to provide a device designed primarily for gauging and testing the position of the valve rod guide arm to align the bearing of the valve rod guide arm with the valve seat, and to also provide means whereby the valve rod guide arm may be secured to the overflow pipe at the proper distance from the valve seat, insuring the proper seating of the flush tank valve, carried at the lower end of the valve rod.

Another important object of the invention is to provide an adjusting and testing means which will insure the accuracy of the location of the bearing of the bearing arm, so that the bearing arm may be permanently secured to the overflow pipe or its support, preventing movement of the valve rod guide arm, after it has been properly aligned by a skilled mechanic.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view of a flush tank pipe assembly, constructed in accordance with the invention, the gauge and testing device being shown in vertical section.

Figure 2 is a plan view of the gauging and testing device in position on the valve seat of a flush tank discharge pipe.

Figure 3 is a perspective view of the upper section of the valve gauge and tester.

Figure 4 is a perspective view of the lower section of the valve gauge and tester.

Figure 5 is a perspective view of the rod used in conjunction with the testing device for aligning the bearing of the valve rod bearing arm, with the testing device.

Referring to the drawing in detail, the outlet pipe of a flush tank valve assembly, is indicated by the reference character 5, and is shown as having communication with the overflow pipe 6 through the passageway 7. The usual ball valve seat of the outlet pipe of the flush tank, is indicated by the reference character 8, and provides the valve seat for the ball valve not shown, of the flush tank assembly.

The usual ball valve of a flush tank assembly is supported at the lower end of a guide rod not shown, the guide rod operating through bearings of the bearing arm supported directly above the valve seat.

In the present showing the bearing arm is indicated by the reference character 9, and is shown as provided with a split band 10 that encircles the overflow pipe 6, the band being temporarily held in position on the overflow pipe 6, by means of the set screw 11 which draws the ends of the split band together. The free end of the bearing arm 9 is formed with aligning openings through which the rod of the flush tank valve operates, and it is important that these bearing openings are properly aligned with respect to the valve seat, to insure the accurate seating of the ball valve at all times.

To insure the proper positioning of the bearing arm, I have provided a gauge which includes a lower section 12 that has a reduced portion 13 of a diameter to fit within the upper end of the outlet pipe, in such a way that the lower section will not frictionally engage the outlet pipe 5 directly below the valve seat 8. This reduced portion provides a shoulder 14 that rests squarely on the upper end of the outlet pipe of the valve assembly, directly above the valve seat, as clearly shown by Figure 1 of the drawing.

The upper surface of the lower section 12 is flat and extends in parallel relation with the shoulder 14 of the lower section, so that the head 15 of the upper section 16, which is also flat, will rest squarely on the upper surface of the lower section, which is also parallel to the upper surface of the section 12 and shoulder 14 as shown by Figure 1.

Both upper and lower sections of the gauge or testing device, are provided with aligning bores extending centrally through the sections, at direct right angles with respect to the contacting surfaces of the head 15, upper surface of the lower section and shoulder 14. These aligning bores are designed for the reception of the aligning rod 17, which is of a diameter equal to the diameter of the threaded portion of the usual flush tank valve rod. The upper end of the aligning rod 17 is extended at right angles providing a finger piece 18 providing means whereby the rod may be readily gripped by the person adjusting or testing the bearing arm or guide, to remove or position the aligning rod.

In the use of the device, the lower section 12 of the device is positioned within the valve seat as shown by Figure 1. The upper section of the device is then positioned directly over the lower section with the bores of the sections in alignment. The bearing arm 9 is now adjusted so that the openings thereof will also align with the bores of the testing device which has been positioned within the outlet pipe of the flush tank valve assembly. The aligning rod 17 is now extended through the bearings of the bearing arm 9, and through the aligning bores of the upper and lower sections of the device, whereupon if the bearing arm 9 is not in its proper or accurate position, the bearing arm may be moved slightly to properly position it with respect to the testing device which is held within the valve seat. When the aligning rod is extended through the bearings of the arm 9 and bores of the device, the bearings will be brought into direct alignment with the bore, centering the bearings with respect to the valve seat. The set screw 11 is now adjusted to tighten the split band 10 on the overflow pipe 6, whereupon the split band may be secured in any suitable manner, as by welding.

The bearings of the guide arm are now permanently held in their proper position with respect to the valve seat to insure the true operation of the valve rod which operates through the bearings of the arm 9.

After the bearing arm 9 has been properly positioned, the rod 17 may be removed and the device disassembled for further use.

While the device is designed primarily for properly locating the center of the outlet pipe and valve seat, it may be used effectively for testing the position of the bearing arm of a flush tank, to insure proper operation of the valve, prior to the positioning of the usual ball valve.

In view of the foregoing detail description, it is believed that a further disclosure as to the operation of the device is unnecessary.

What is claimed is:

1. A device for truing a movable valve rod bearing arm with respect to a stationary valve seat, comprising a lower gauge member adapted to fit snugly within a valve seat, an annular shoulder on said gauge member and adapted to rest on the valve seat, an upper gauge member, a head at the lower end of the upper gauge member and adapted to rest on the upper surface of the lower gauge member, said upper gauge member being elongated and adapted to extend to a point adjacent to the rod bearing arm being adjusted, indicating the position of the rod bearing arm with respect to the valve seat, said gauge members having aligning openings, and a gauge rod adapted to extend through the bearing arm and aligning openings of the gauge members, aligning the rod bearing arm with the gauge members.

2. A device for truing a movable valve rod bearing arm with respect to a stationary valve seat, comprising a lower gauge member of a diameter to snugly fit within the valve seat, an annular shoulder formed on the lower member and adapted to rest squarely on the upper edge of the valve seat, an elongated upper gauge member, a head on the lower end of said upper gauge member, said head adapted to rest squarely on the upper surface of the lower gauge member, said upper and lower gauge members having aligning openings, and a gauge rod adapted to extend through the bearing arm under treatment, and aligning openings of the upper and lower gauge members, aligning the opening of the valve rod bearing arm, with the openings of said gauge members.

FRANK M. HEATH.